United States Patent [19]

Barndt, Sr.

[11] Patent Number: 4,888,791
[45] Date of Patent: Dec. 19, 1989

[54] CLOCK DECODER AND DATA BIT TRANSITION DETECTOR FOR FIBER OPTIC WORK STATION

[76] Inventor: Robert A. Barndt, Sr., 5 Regency Cir., Coatesville, Pa. 19320

[21] Appl. No.: 147,490

[22] Filed: Jan. 25, 1988

[51] Int. Cl.[4] .......................... H03K 9/10; H04L 7/02
[52] U.S. Cl. ...................... 375/23; 375/95; 375/110; 307/234; 328/108
[58] Field of Search ............ 375/87, 110, 95, 23, 375/22; 328/108, 109; 360/40, 48, 51; 307/272.1, 273, 234

[56] References Cited

U.S. PATENT DOCUMENTS

| | | | |
|---|---|---|---|
| 3,979,746 | 9/1976 | Jarrett | 375/87 |
| 4,267,595 | 5/1981 | Hernandez | 375/95 |
| 4,675,597 | 6/1987 | Hernández | 307/234 |

Primary Examiner—Benedict V. Safourek
Assistant Examiner—Marianne Huseman

[57] ABSTRACT

Apparatus for use in a fiber optic transmission system having a variable bit rate and a variable duty cycle. The system senses data bit transmissions of bi-phase encoded data, and provides a restored clock frequency corresponding to a clock encoded in the bi-phase data. Mid-bit zero data transmissions are distinguished from the transitions denoting the beginning and end of a data pulse to define the pulse duty cycle. A logic circuit transfers operation between high speed and low speed modes of operation.

9 Claims, 3 Drawing Sheets

CLOCK DECODER AND DATA BIT TRANSITION DETECTOR FOR FIBER OPTIC WORK STATION

BACKGROUND OF THE INVENTION

1. Field of the invention

The present invention relates generally to fiber optic data transmission systems, and more particularly to an apparatus for decoding a variable clock rate and for detecting and determining the duration of a data bit of an incoming digital signal occurring at a variable rate for use in a fiber optic work station capable of operation in a plurality of data rates without user or software intervention.

2. Description of the Prior Art

Fiber optics have been found to be particularly efficient for transmission of digital data between computer work stations. A present day work station configuration may employ multiple slave work stations, wherein advances in technology have permitted newly emplaced work stations to operate at a higher data rate than the earlier emplaced work stations. For example, while the older work stations may operate at a maximum of 307.2 Kbit/sec, a present day work station may operate at 1.8 Mbit/sec. A system for detecting the data rate (e.g., high speed bit rate or low speed bit rate) capability of the work station and adjusting the transmitted data rate automatically without software or operator intervention is described in U.S. patent application Ser. 121,389, Dynamic Speed Shifter for Fiber Optic Work Station, assigned to the assignee of the present invention, and which is hereby incorporated by reference.

As a consequence of the logic arrangement conventionally utilized by programmable array logic for asynchronous transmission of fiber optic data, using bi-phase zero data encoded in a self-clocking serial data transmission mode, the duration of each data bit and the embedded clock pulse may vary from pulse to pulse. In order to retransmit data to successive work stations, or back to the host computer, it is essential that the clock pulses and data bit duration be accurately reconstructed substantially in real time. Conventional decoding techniques which assume a 50 percent duty cycle in which the receiver attempts to sample at the center of each bit time, are inaccurate where the bi-phase pulse is asymmetrical and of varying duty cycle. Further, since bi-phase data may have transistions encoded within the data bit, as in a zero bit, the mere detection of a transition is insufficient to distinguish the start and end of a data bit.

The present invention improves over the prior art by providing an apparatus which detects the start and end transitions defining a bi-phase encoded data bit and distinguishes against transitions encoded within the data bit, and is useful for a dynamically varying bit rate and bit duration. It further provides, without additional circuitry, for receiving and decoding the embedded clock rate.

SUMMARY OF THE INVENTION

In accordance with the present invention, the apparatus is coupled to respond to a plurality of signals from a fiber-optic work station having a serial data transmission interface, in which incoming data is encoded in bi-phase format at a variable bit rate. The work station provides a source of regular clock pulses, a look-ahead signal indicative of start, midbit and end transitions of the bi-phase data, a delayed signal synchronized with the fiber optic data, and counter pulses whose magnitude is representative of the duration of a data bit in either a high speed or slow speed operational mode.

The apparatus provides a decoder which is coupled to receive the counter pulses and thereby provide an output pulse corresponding to the duration of the received data bit. The decoder output feeds the input of a type D flip-flop, which is being clocked by the regular clock pulses, so as to provide a signal delayed with respect to the decoder output and synchronized with the clock pulses, having a duration corresponding to the decoder output. The delayed output results in regenerating a delayed clock whose duration and repetition rate is derived from the fiber optic data without approximation and hence may be retransmitted without degradation even though the bit duration is varying from pulse to pulse.

The apparatus further provides a J-K flip-flop coupled to receive the look-ahead signal and the decoder output, whose output drives a logic gate in coincidence with the synchronized edge detected fiber optic data, so as to provide a signal corresponding only to start and end transitions of the data bits when the resultant signal is fed in closed loop fashion to set the J-K flip-flop.

DESCRIPTION OF THE PREFERRED EMBODIMENT

Figure 1:
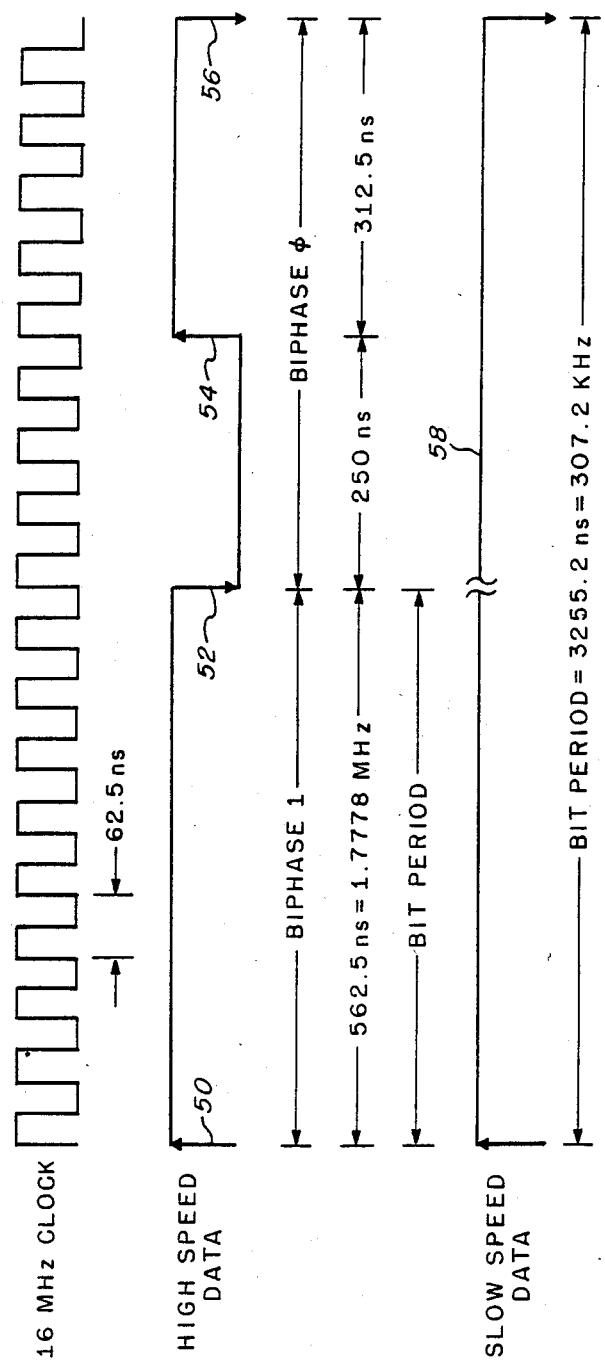
FIG. 1 is a waveform timing diagram showing the relationship of the high speed and low speed modes of operation.

A fiber optic work station of the present invention preferably employs a 16 MHz clock which has a period of 62.5 ns to provide regular clock pulses as shown in FIG. 1. Bi-phase zero encoded data is transmitted to the work station and is a self-clocking serial data transmission code. As seen in FIG. 1, a transition, denoted by an up or down arrow, occurs at the leading and trailing edge of every data bit period. A logic "1" has no transitions between the leading and trailing edges of the data bit period. A logic "0" is represented by an additional transition which occurs approximately at mid-bit time. In the present invention, the bit period of high speed data is nominally 562.5 ns, corresponding to a given bit rate of the incoming encoded data stream of 1.7778 MHz. This rate may vary between 1.3333 MHz and 1.7778 MHz. The bi-phase zero code provides a transition nominally at 250 ns of the total bit period. This bit rate is referred to as "high speed". Slow speed data, which occurs at a further bit rate of 276.6 KHz to 307.2 KHz has a corresponding bit period at 307.2 KHz of 3255.2 ns. Thus, it may be seen that the high speed data and slow speed data are related by a frequency ratio of approximately six to one. Further, the mid-bit transmission may vary in a ratio of 4:5 through 4-8 clock cycles, this rate being variable from bit to bit.

A high speed bi-phase data bit period, when clocked at 16 MHz, is seen to be comprised of nine data bit intervals, each interval nominally of 62.5 ns duration. correspondingly, a slow speed data bit period is seen to be comprised of 52 data bit intervals nominally of 62.5 ns duration.

The present invention is so constructed and arranged as to detect the intervals between transitions of the encoded data and discriminate against mid-bit transition.

Figure 2:
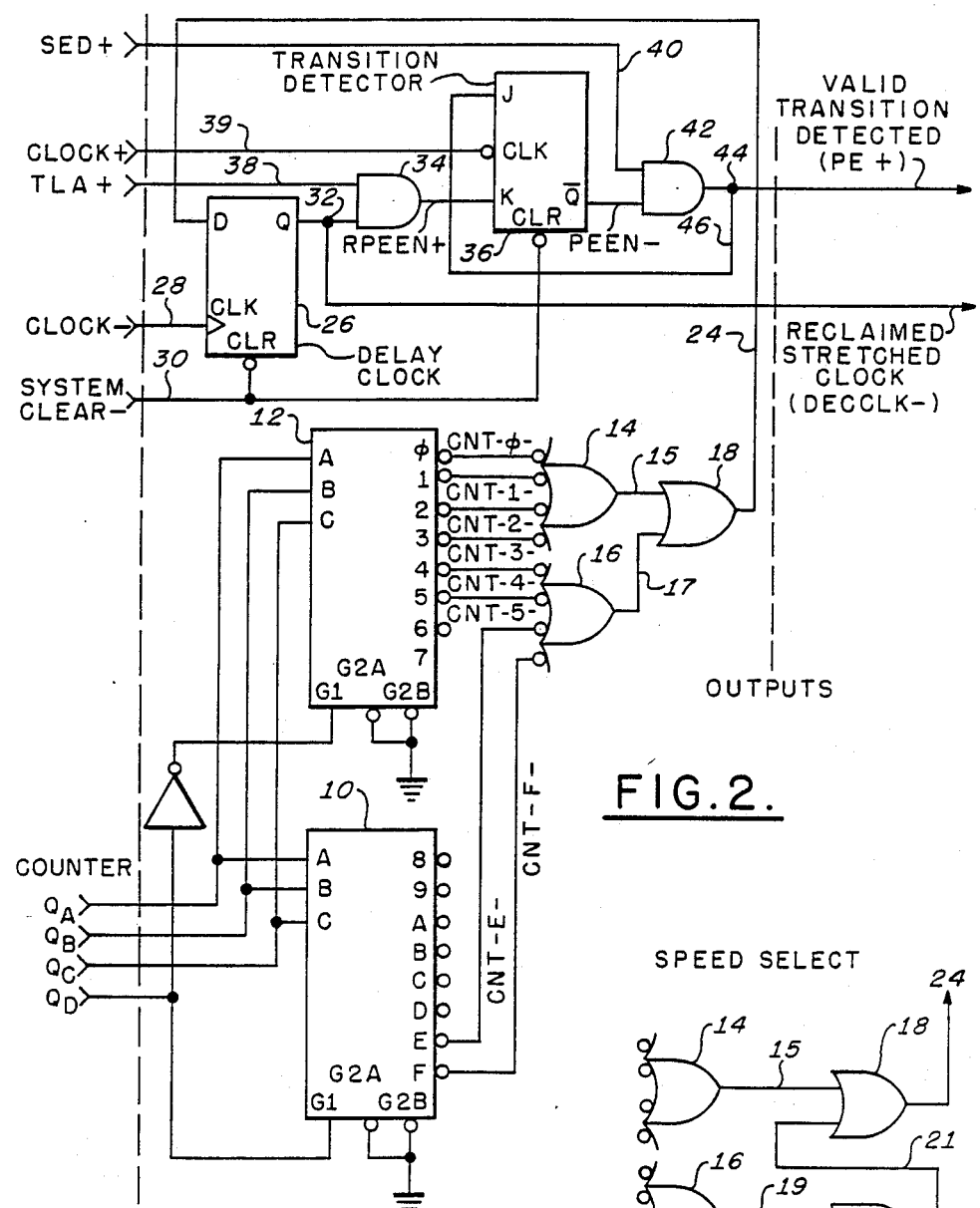
FIG. 2 is a schematic diagram showing the detection circuitry of the present invention.
Figure 4:
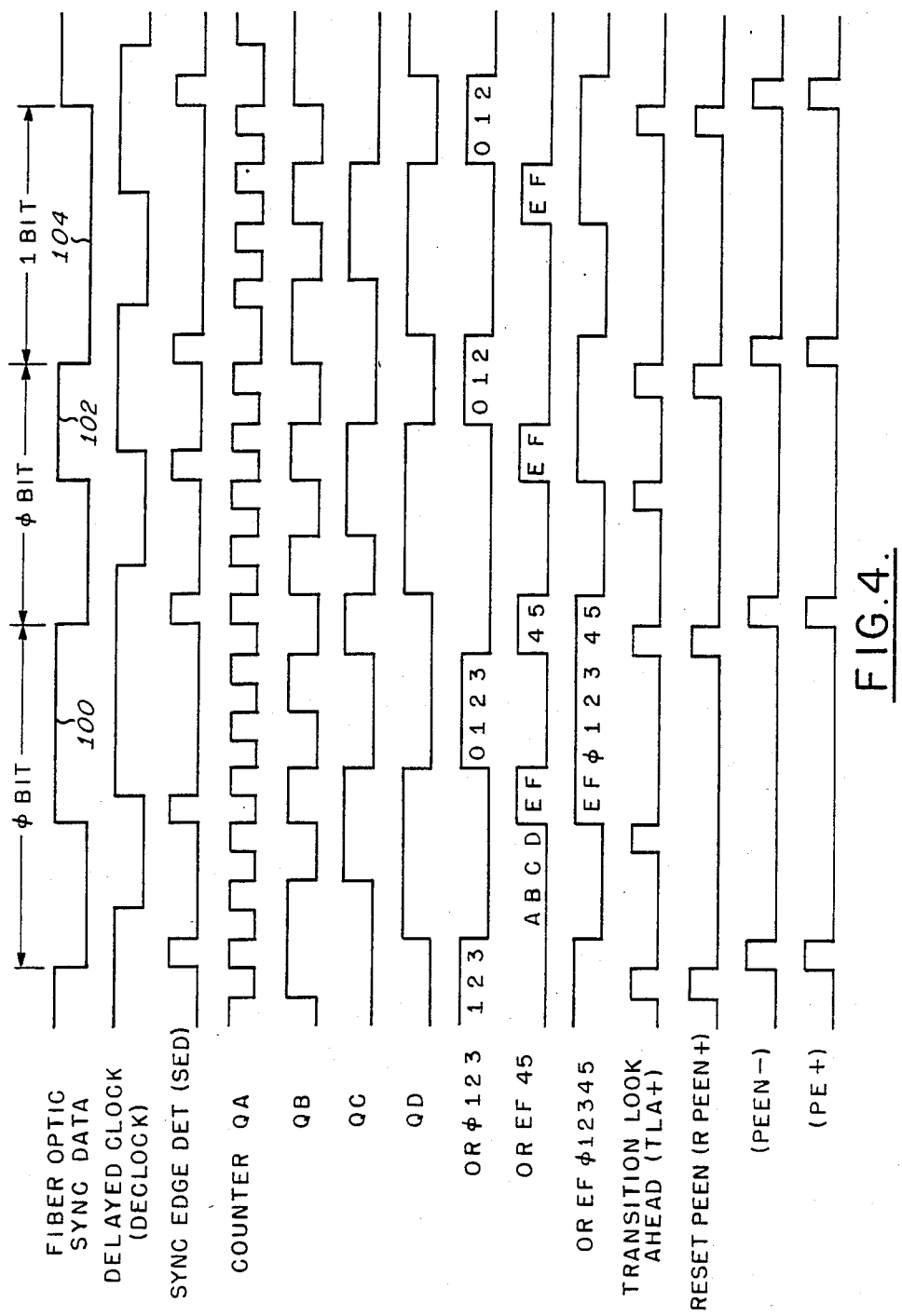
FIG. 4 is a waveform showing the timing relationship of signal waveforms of the present invention.

Referring now to FIG. 2, there is shown a schematic diagram in block diagram form of the present invention. Input signals, generated by conventional means in accordance with the waveforms of FIG. 4, are applied to the inputs. A suitable system for generating such signals is shown in the referenced application Ser. No. 121,389. These signals are comprised of CLOCK+, which is preferably a 16 MHz crystal-controlled timebase, and CLOCK—, which is the inverted waveform of CLOCK+. SYSTEM CLEAR— is a short negative pulse applied on power up to reset type D flip-flop 26 and J-K flip-flop 36, after which the line remains positive for the duration of operation. Counter inputs QA, QB, QC and QD are derived by sequentially incrementing a predetermined load count at the 16 MHz clock rate, in a manner to be described. The counter signals are applied to conventional cascaded decoders 10 and 12 to derive a binary output representative of the value of the count. The binary output is in the form of a plurality of mutually exclusive active low output pulses, denoted by CNT 0— through CNT 5—, CNT E— and CNT F—.

Outputs CNT 0— through CNT 3— are applied to OR logic gate 14 and provide an output on line 15 that is proportional to the duration of the counts. Outputs CNT 4—, CNT 5—, CNT E—, and CNT F— are coupled to a second OR gate 16, where the summed outputs on line 17 are applied to a third OR logic gate 18, also responsive to the signal on line 15. Thus, the duration of the signal on line 24 is representative of a duration corresponding to the count intervals of counts E or F or CNT 0— through CNT 5—. This signal corresponds to the duration of the clock pulse embedded in the bi-phase fiber optic data. When applied via line 24 to flip-flop 26, which provides a predetermined delay corresponding to the pulse width of CLOCK—, a delayed clock signal DECCLK— results, which is stretched or contracted in duration in accordance with the data-bit duration. This signal is applied at node 32 to AND gate 34, which also receives a look-ahead signal TLA+ on line 38. The look-ahead signal is a synchronized transition pulse generated from the fiber optic data pulses and is derived one clock prior to SED+ from a previous bit period to provide the appropriate timing creation of RPEEN+. (Because of the way that RPEEN+ has been created, it will always be a one clock wide pulse that occurs at the end of a bit period. It therefore can also be titled EBPP+, Ending Bit Period Pulse). Output RPEEN+ s applied to the reset input K of a bistable flip-flop 36. When reset by the coincidence of TLA+ and the delayed decoder outputs, flip-flop 36 provides complementary output PEEN-to AND gate 42. AND gate 42 also receives a signal SED+ on line 40. Signal SED+ is synchronized with the transitions of the fiber optic data pulses. Thus, since signal PEEN— is active high only on leading transitions of the data bit pulses, and not on midbit transitions, output signal PE+ at node 44 occurs only at the start transitions of the data bit, and is indicative of valid transition pulses, independent of the varying bit rate.

The output of gate 42 is also coupled in closed loop fashion via lead 46 to the set input J of flip-flop 36, whose operation is further described below.

Figure 3:
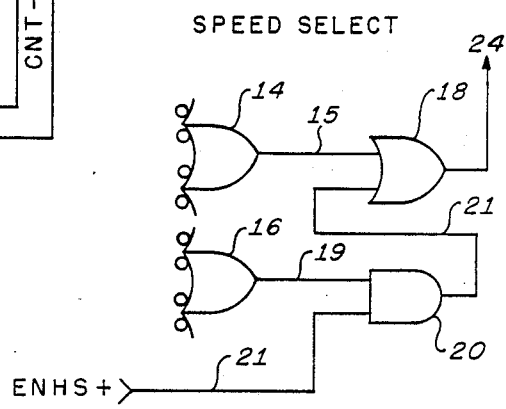
FIG. 3 is a modification of the present invention useful with high and low speed data operation modes.

The invention shown in FIG. 2 may be adapted for selectable response to high speed or slow speed bit rates by the modification shown in FIG. 3. The output of OR gate 16 is coupled via lead 19 to one input of a third AND gate 20, whose output is provided as one input to OR gate 18. AND gate 20 also receives a signal ENHS+, which is a logic high in the high speed mode and a logic low in the low speed mode. Thus, the outputs of OR gate 16, being CNT 4—, CNT 5—, CNT E—, and CNT F—, will be decoupled in the low speed mode, and coupled to gate 18 in the high speed mode.

The foregoing circuit arrangement results in operation as follows. The clock "stretch" and valid transition circuitry of FIG. 2 must be capable of dealing with bit rates of varying pulse duration. The system in its high speed mode operates nominally at 1.8 MHz but must be capable of operation in a range of 1.3333 through 1.7778 MHz. In the slow speed mode, the system operates in the range 275.664 through 307.2 KHz. While there is no apriori knowledge of the bit rate, the system is so constructed and arranged as to power up in the high speed mode, and to transfer automatically to low speed in response to work station capabilities. A further problem arises from the varying duty cycle of the embedded clock, which may range from 9 to 12 states wide, but is always 4 states wide during the logic high state of the waveform. The low state of the clock waveform may range from 5 to 8 states. Further, these characteristics are varying constantly in an unknown pattern. These characteristics are inherent in the design of the fiber optic transmission system with which the present invention is utilized.

It is clear that the clock pulse may be decoded by sensing durations and duty cycle of the data bits, which are defined by a start transition and an end transition for a one bit, and by an additional midbit transition for a zero bit. The object of the invention is to determine valid transistions demarking the beginning and end of a bit period. A transition that occurs in the middle of a bit period, in terms of the clock recovery operation, is therefore an invalid transition, and the circuit must inhibit such transitions from introducing an error into the detection circuitry.

Referring now to FIG. 1, the main crystal-controlled timebase is typically operating at a frequency of 16 MHz. At a high speed bit rate of 1.7778 MHz, each bit is 562.5 ns in duration. Bi-phase 1 is seen to have a start and end transition 50,52. Bi-phase 0 utilizes the end transition 52 of the prior bit as its start transition, and has a midbit transition 54 as well as an end transition 56. Each bit is seen to occupy 9 clock cycles, with the 0 bit having a duty cycle of 4:5. A slow speed data bit 58 has a duration of 3255.2 ns at 307.2 KHz, with a clock period 3.25 μs and a half duty cycle varying between 1.62 and 2.0 μs.

Referring to FIG. 2, on power up type D flip-flop 26 and J-K flip-flop 36 are preset by a SYSTEM CLEAR- signal on line 30 so that the Q terminal of flip-flop 26 is an active high signal and the Q terminal of flip-flop 36 is an active low signal. Referring now to FIG. 4, with continued reference to FIG. 2 Fiber OPtic Sync Data (FOSD) represents the input fiber optic data after conversion to an electrical waveform and synchronization through several stages to provide a stable fiber optic signal, in a conventional manner. The FOSD waveform here comprises a train of 0 bits 100, 102 and a 1 bit 104. ON the first transition of fiber optic data, a parallel enable signal (PE+) is generated, in a manner to be described. In the high speed count state, the PE+ signal will cause an A (hex) count to be loaded into a counter (not shown). The counter is incremented by the 16 MHz clock and the outputs QA, QB, QC and QD applied to cascaded decoders 10 and 12. Since the maximum bit duration is 12 states wide, a count of E through 5 (hex) is sufficient to determine the length of the fiber optic pulse in the high speed mode. Decoder outputs 0-3 are coupled to an OR logic gate 14, and decoder outputs 4-5, E, and F are coupled to a second logic gate 16. All decoder outputs are active low, denoted by a bar (−). The OR'ed decoded counts are processed through a one clock period delay to avoid spiking transients characteristic of the OR logic operation. Counts were chosen therefore taking this delay into consideration. The output of gate 14 on line 15 is shown as waveform OR0123. The output of gate 16 on line 17 is shown in waveform OREF45. The two logic outputs are combine in a further OR logic gate 18 to provide a waveform OREF12345 on line 24 whose duty cycle corresponds to the embedded clock. The signal on line 24 is applied to the D input of flip-flop 26, and on the next clock cycle provides a delayed output which is free of undesired spikes. The signal at the Q output of flip-flop 26 appears at node 32 and is recovered as a reclaimed clock signal DECCLK− corresponding to the embedded clock in the data pulse. It may be seen that the number of counts coupled through the OR gates depends on when the next PE+ pulse occurs to reload the counter with an A (hex).

The signal at node 32 is combined with signal TLA+. This is an acronym for Transition Look Ahead and when generated enables the transmission of the fiber optic data. It is time phased to occur one clock pulse before the data bit transitions. The TLA and DECCLK−signals are coupled to AND gate 34 via lines 38 and node 32 and when in coincidence generate a signal Reset PE Enable (RPEEN). RPEEN occurs at the end transitions of the data bits.

The signal RPEEN is applied to the K (reset) input of flip-flop 36 and on the trailing edge of the FOSD pulse, coincident with the rise of the next clock pulse applied on line 38 to dock input CK, resets flip-flop 36, causing $\bar{Q}$ signal PEEN− to go to logic high. Simultaneously, signal SED is generated. Signal SED represents the Synchronized Edge Detector, which is derived by synchronizing the input fiber optic data with the initial clock frequency to provide a pulse on every transition, both for zero bit and one bit data. A suitable circuit is shown in application U.S. Pat. No. 4,763,338, Synchronous Signal Decoder, assigned to the assignee of the present invention, and incorporated herein by reference. It is generated by combining fiber optic synchronized data and delayed fiber optic synchronized data in an XOR logic gate and results in a pulse having a period equal to the clock period, and occurring in sequence after the TLA signal. The output PEEN- in a high state when combined with SED in logic AND gate 42 results in the desired output, signal PE+, which is fed back in closed loop fashion to the set input J of flip-flop 36 and after one clock interval causes PEEN− to go low again. On the same clock pulse that set flip-flop 36, the counter is caused to reload an A (hex), thereby setting up the zero bit blocking window for the next bit period.

While FIG. 2 has been shown for operation in the high speed mode, the circuit of FIG. 3 may be used to operate in the low speed bit rate mode. For low speed operation, it is only necessary to load the counter with a C (hex) and count from CNT0 to CNT3. Therefore, an AND logic gate 20 is coupled between OR gate 16 and OR gate 18 to inhibit additional counts. A signal ENHS+when at a logic high is used to enable high speed operation. The logic counts of decoders 12 and 10 are then coupled via lead 10 to AND gate 20 and via lead 21 to OR gate 18. The circuit then operates in the manner that has been described with respect to FIG. 2. In the low speed mode, signal ENHS+is caused to go to a logic low, so that AND gate 20 blocks any signals from OR gate 16.

It may be seen from the foregoing that the present invention provides a novel approach to decoding biphase fiber optic data, and permits recovery of an embedded clock and detection of valid data bit transitions for signals of varying duty cycle and repetition rate.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for generating signals indicative of start and end transitions of a data bit of an incoming data stream and having a variable clock frequency encoded therein and transmitted in at least one of a plurality of bit rates, comprising:

decoder means responsive to a first signal indicative of a duration of said data bit for providing a second signal in binary form corresponding to said duration of said data bit, monostable switch means responsive to a source of regular clock pulses and to said second signal for providing a third signal representative of said variable clock frequency at a predetermined delay with respect thereto, and bistable switch means responsive to said delayed clock signal and to said source of regular clock pulses, and further responsive to a fourth signal indicative of start, midbit, and end transitions of said data bit, said bistable switch means having a first operative state when said third signal and said fourth signal are in coincidence and having a second operative state for producing a fifth signal representative of said start and end transitions but excluding said midbit transitions.

2. The apparatus as set forth in claim 1, further comprising first logic gate means responsive to said fourth signal and said third signal, for providing a signal indicative of a coincidence thereof and coupled intermediate said monostable switch means and said bistable switch means.

3. The apparatus as set forth in claim 2, further comprising second logic gate means responsive to a further signal representative of start, midbit, and end transitions and to an output of said bistable switch means when in said first operative state, for producing said fifth signal in a given logic state, wherein said fifth signal is also coupled to an input of said bistable switch means for changing the active state thereof in response to said regular clock pulses.

4. The apparatus as set forth in claim 3, said decoder means further comprising first decoder means having an input and a plurality of outputs coupled to third logic gate means for providing an output corresponding to sums of said decoder outputs; and second decoder means having an input coupled to said input of said first decoder means for providing a further plurality of outputs to fourth logic gate means corresponding to sums of said further plurality of outputs, said third and four the logic gate means coupled to energize fifth logic gate means for providing said second signal corresponding to sums of outputs of said first and second decoder means to said monostable switch means.

5. The apparatus as set forth in claim 4, comprising:
sixth logic gate means responsive to a signal indicative of a predetermined bit rate and to said fourth logic means, for providing a first output indicative of a high speed bit rate and a second output indicative of a low speed bit rate in accordance with said predetermined bit rate to said fifth logic gate means.

6. The apparatus as set forth in claim 5, wherein said first decoder means is operative in said low speed bit rate and said first and second decoder means are operative in said high speed bit rate.

7. The apparatus as set forth in claim 6, wherein said plurality of bit rates are 1.333 to 1.7778 Mbits/sec and 275.6 to 307.2 Kbits/sec.

8. The apparatus as set forth in claim 7, wherein said duration of said data bit varies between 9 and 12 clock cycles.

9. The apparatus as set for the in claim 8, wherein said count signal comprises an A (hex) incremented over 9 to 12 clock cycles at said high speed bit rate, and a C (hex) so incremented at said low speed bit rate.

* * * * *

UNITED STATES PATENT AND TRADEMARK OFFICE
CERTIFICATE OF CORRECTION

PATENT NO.   : 4,888,791
DATED        : Dec. 19, 1989
INVENTOR(S)  : Robert A. Barndt, Sr.

It is certified that error appears in the above-identified patent and that said Letters Patent is hereby corrected as shown below:

Title page, under the designation of Inventor, insert:

Assignee: Unisys Corporation

Blue Bell, Pa.

Under the Assistant Examiner, insert:

Attorney, Agent, or Firm- Albert B. Cooper; Arnold L. Albin

Signed and Sealed this

Sixteenth Day of April, 1991

*Attest:*

HARRY F. MANBECK, JR.

*Attesting Officer*      *Commissioner of Patents and Trademarks*